No. 611,467. Patented Sept. 27, 1898.
W. DODGE.
CHAIN PROPELLER.
(Application filed Aug. 25, 1897.)
(No Model.)
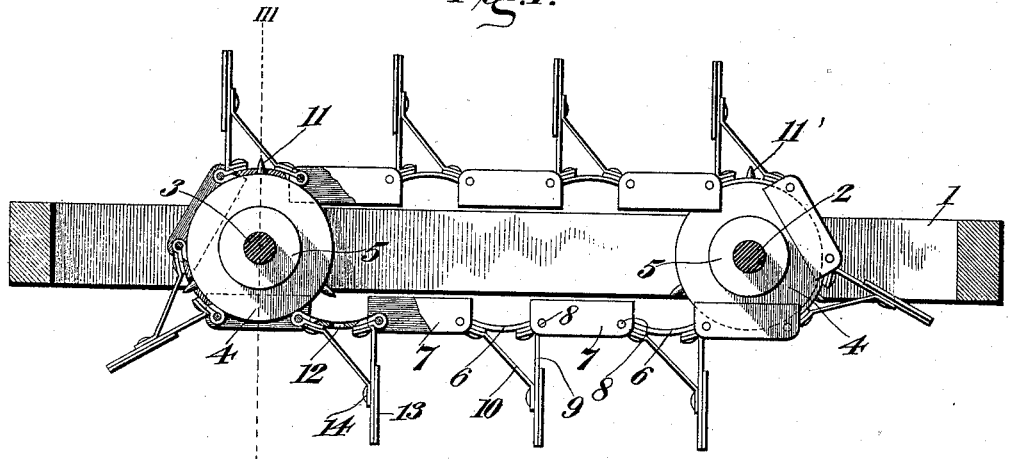
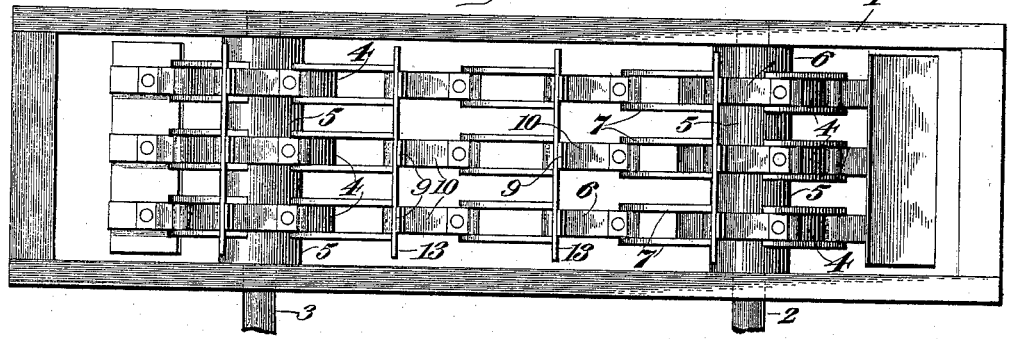
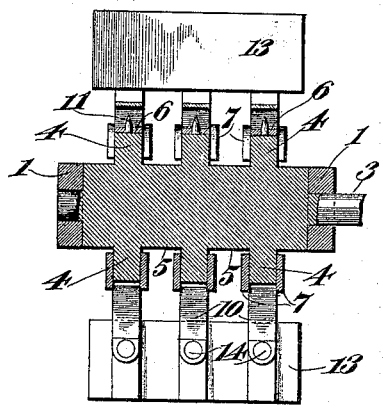
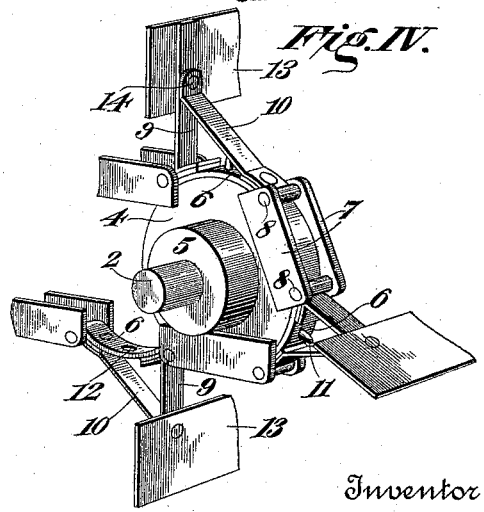
Witnesses
M. C. Fowler
Chester A. Baker
Inventor:
Walter Dodge,
By Joseph T. Atkins,
Attorney.

UNITED STATES PATENT OFFICE.

WALTER DODGE, OF MONTEREY, CALIFORNIA.

CHAIN PROPELLER.

SPECIFICATION forming part of Letters Patent No. 611,467, dated September 27, 1898.

Application filed August 25, 1897. Serial No. 649,470. (No model.)

*To all whom it may concern:*

Be it known that I, WALTER DODGE, of Monterey, in the county of Monterey, State of California, have invented certain new and useful Improvements in Propelling Devices for Steamboats, of which the following is a complete specification, reference being had to the accompanying drawings.

The object of my invention is to produce improvements in that class of marine propellers in which paddles or blades carried by chains and especially adapted for use in comparatively shoal water are adapted to be driven with great force and practical efficiency.

By my invention it is proposed to increase the durability of the mechanism and to reduce the liability of breakage and consequent stoppage of the apparatus in practice.

In the accompanying drawings, Figure I is a side elevation of my apparatus, partly in section. Fig. II is a top plan view of the same. Fig. III is a section on the line III of Fig. I. Fig. IV is a perspective view of a portion of one chain and its driving-pulley.

Referring to the figures on the drawings, 1 indicates a frame, which may be of any suitable shape and dimensions and in the rectangular form in which it is illustrated is adapted to be applied upon the side of a boat. In practice two frames, with the suitable mechanism which they accommodate, are designed to be applied to a boat, one upon each side thereof.

2 and 3 represent shafts mounted in proper bearings in the side pieces of the frame at suitable distances apart therein. The shafts are provided with a plurality of driving-pulleys 4, which are preferably spaced and mounted upon a hub or cylinder secured to its shaft.

In the form illustrated I show three pulleys mounted upon each of the shafts 2 and 3. Upon each pulley I provide an endless chain composed, preferably, of alternately-disposed open links and guide-links. Each of the open links is composed of a base-plate 6, curved to conform to the periphery of the pulley 4, around which they work. The guide-links are composed, preferably, of two plates 7, secured, as by pins or bolts 8, to the ends of adjacent plates 6. Each of the plates 6 carries at one end an upright 9 and an inclined brace 10, extending, preferably, between the opposite end of the plate 6 and the upright 9. Each of the pulleys is provided with studs or projections 11, spaced at required intervals upon its periphery, to enter apertures 12, provided in each of the plates 6. By this means a positive engagement between the pulleys and each of the open links of the chain is provided while the links are riding upon the pulleys. The guide-links are supported upon the pulleys by the bearings in the plate 6 for the pins 8 and hold the chain at all times in position upon the pulleys through the overlapping of the plates 7 upon the pulleys, the distance between the plates 7 being adapted to accommodate the width of the pulleys provided for them.

I prefer, as above suggested, to mount the chains in gangs upon a plurality of pulleys and to provide for the equal movement of all the chains carried upon each pair of shafts. By this means the uprights 9 upon the respective chains may be compelled to move in alinement and each set of uprights adapted to support a common blade or paddle 13, the same bolt 14 serving to secure to the upright the paddle and an inclined brace 10.

The object of providing a plurality of supports or uprights upon a plurality of chains for a common blade is to avoid twisting strain upon the blade while the latter is being forced through the water and also to insure the continued operation of the machine in case one of the chains or the driving mechanism of one of the chains should be damaged.

In practice power is applied to one or both of the shafts 2 and 3 by any suitable means. (Not illustrated.) The rotation of the shafts imparts movement in the required direction to the chains which carry the paddles or blades, a plurality of blades being caused to move through the water at the same time in the manner usual in this class of devices.

What I claim is—

1. In a propelling device for steamboats and the like, the combination with a frame, a pair of shafts and a plurality of pulleys upon each shaft provided respectively with peripheral projections, of a chain for each set of pulleys on the respective shafts, each chain consisting of alternate curved plates designed to conform to the curvatures of the pulleys and apertured for the reception of the projections, and parallel plates united in pairs extending against the opposite sides of the pulleys and pivoted at their outer corners to the contiguous ends of the curved plates, and paddles secured respectively to each of the chains, substantially as specified.

2. The combination with a frame, a plurality of shafts and a plurality of pulleys upon each shaft, of a chain for each set of pulleys on the shafts, said chains being composed of alternate links consisting of a longitudinally-curved plate and of two parallel plates beyond the side faces of the curved links, paddles located at the extremities of the curved plates and bracing the parallel plates at their outer corners whereby the curved links lie flat against the faces of the pulleys and the parallel plates lie flat against the sides of the pulleys, uprights extending outwardly from one end of each of the curved links, braces secured at their opposite ends to the opposite ends of each of the curved links and to the uprights, and paddles secured respectively to the corresponding uprights of each of the chains, substantially as specified.

3. A chain designed for use as an element of a propelling device for steamboats, composed of alternate longitudinally-curved plates having their extremities bent back and secured upon the body of the plate to form terminal sleeves for the reception of pintles, parallel plates intermediate of each of the curved plates and beyond the edges thereof, pintles passed through the terminal sleeves of the curved plates and piercing the parallel plates adjacent to their outer corners, and mechanism upon each of the curved plates for supporting the paddles, substantially as specified.

In testimony of all which I have hereunto subscribed my name.

WALTER DODGE.

Witnesses:
D. J. HOUGHTON,
C. M. FLOWER.